United States Patent [19]

Gibbons

[11] Patent Number: 4,690,128
[45] Date of Patent: Sep. 1, 1987

[54] INSULATED FLEXIBLE BLADDER SOLAR COLLECTOR

[76] Inventor: Carl B. Gibbons, 720 S. 1650 East, Clearfield, Utah 84015

[21] Appl. No.: 904,200

[22] Filed: Sep. 8, 1986

[51] Int. Cl.$^4$ ............................................. F24J 2/56
[52] U.S. Cl. .................................. 126/450; 126/418; 126/426
[58] Field of Search ............... 126/418, 426, 437, 450, 126/443, 446, 444

[56] References Cited

U.S. PATENT DOCUMENTS

| | | | |
|---|---|---|---|
| 3,029,806 | 4/1962 | Okuda | 126/426 |
| 4,044,754 | 8/1977 | Cronin et al. | 126/420 |
| 4,111,186 | 9/1978 | Ross et al. | 126/426 |
| 4,221,210 | 9/1980 | Cvijanovich | 126/445 |
| 4,346,731 | 8/1982 | Sigworth, Jr. | 137/433 |
| 4,426,999 | 1/1984 | Evans et al. | 126/450 |
| 4,503,840 | 3/1985 | Chertok | 126/444 |
| 4,520,793 | 6/1985 | Hall | 126/426 |

FOREIGN PATENT DOCUMENTS

| | | | |
|---|---|---|---|
| 52-14938 | 2/1977 | Japan | 126/426 |
| 60-50347 | 3/1985 | Japan | 126/418 |
| 60-174456 | 9/1985 | Japan | 126/426 |

Primary Examiner—Samuel Scott
Assistant Examiner—Allen J. Flanigan
Attorney, Agent, or Firm—Thorpe, North & Western

[57] ABSTRACT

A solar collector for heating water consisting of an insulated housing having a darkened interior and a light transmitting top which preferably filters out solar rays in the UV range. The housing has ventilation apertures in opposing walls. A soft, flexible, non-opaque plastic bladder is contained within the housing. At least the upper portion of the bladder is translucent so as to partially scatter solar rays. The bladder contains water inlet and outlet means and preferably has a valve in the upper portion which allows the venting of trapped air within the bladder and prevents outside air from entering the bladder and water from overflowing the bladder. When the bladder is filled, it blocks the ventilation aperture. Solar radiation is transmitted through the housing top and scattered or diffused by the translucent bladder. Some solar rays are absorbed by the water in the bladder and converted to heat. Rays not absorbed by the water are absorbed by the darkened interior of the housing and also converted to heat. When the bladder is empty, the ventilation apertures are uncovered and outside air circulates through the housing, preventing buildup of excessive heat in the housing.

12 Claims, 4 Drawing Figures

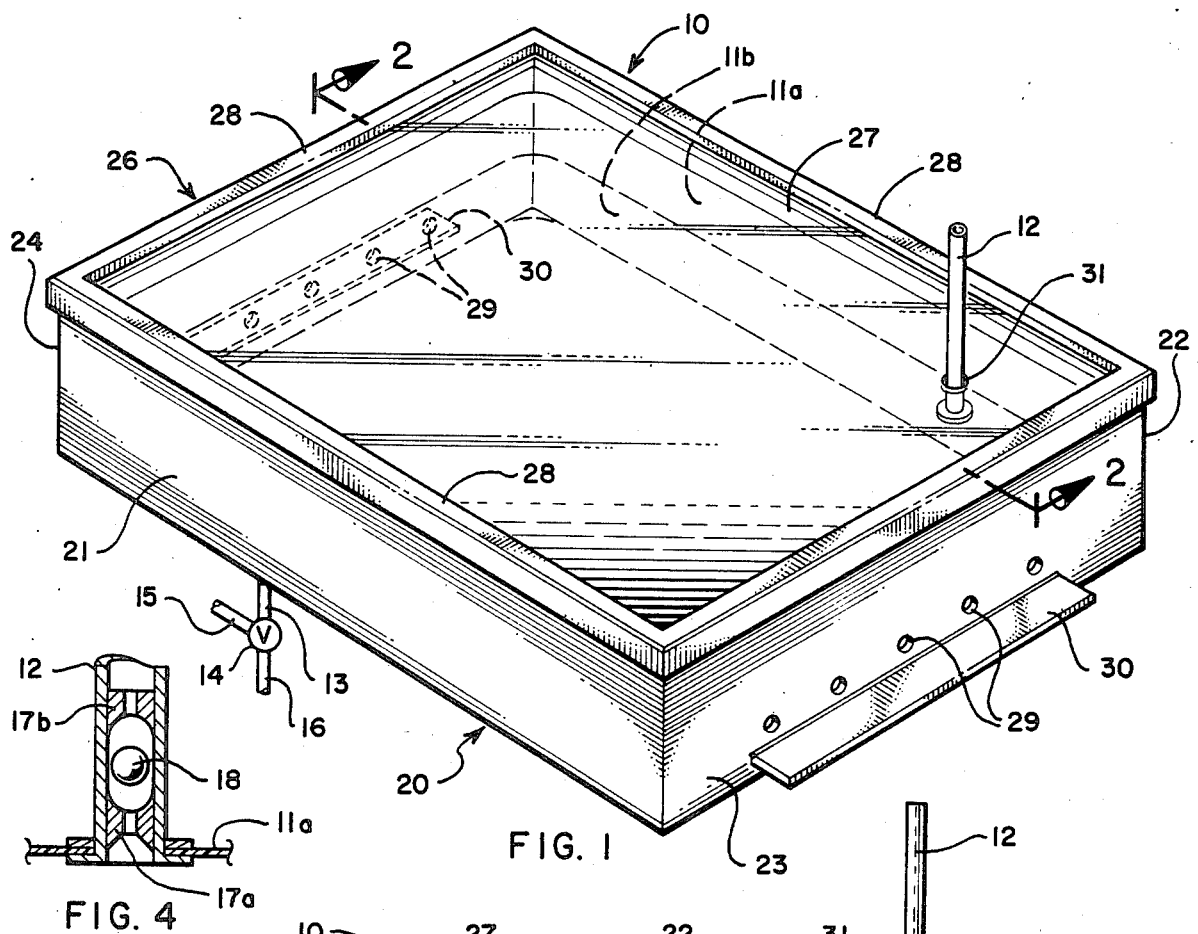
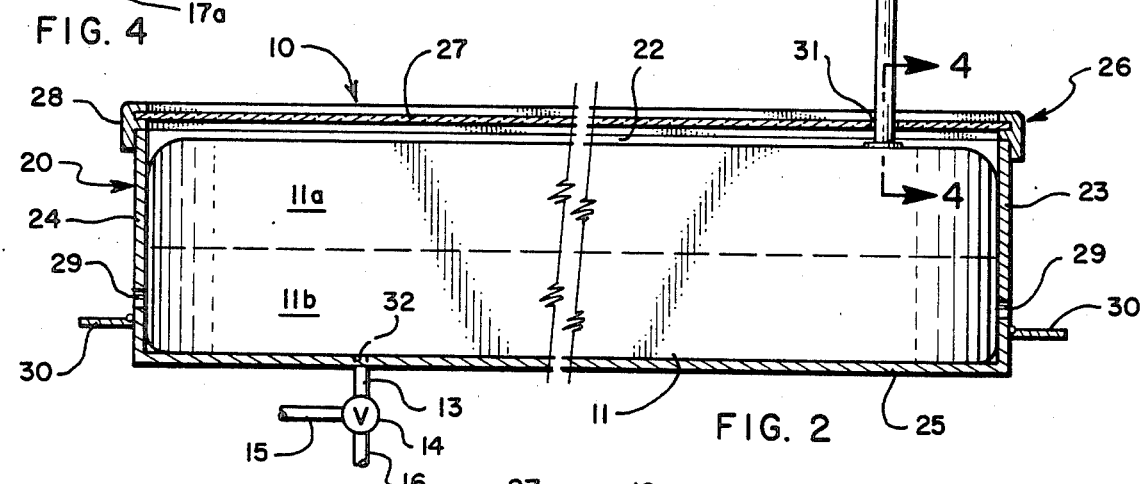
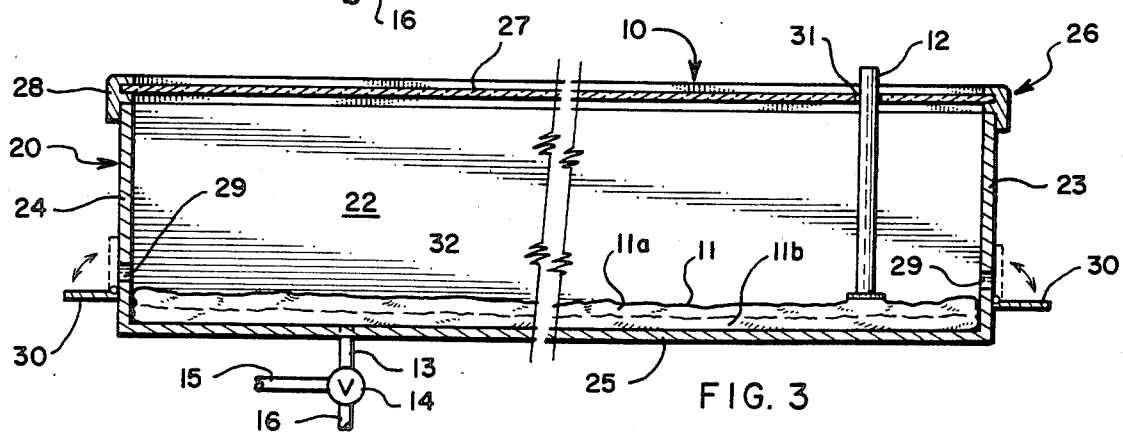

INSULATED FLEXIBLE BLADDER SOLAR COLLECTOR

BACKGROUND OF THE INVENTION

This invention relates to a bladder type solar energy collector device. More particularly, this invention relates to a bladder type solar energy collector device which is resistant to deterioration by ultraviolet rays and which maximizes heat retention by means of enclosing the bladder in a heat absorbing insulated housing.

Various types of solar collectors for the heating of water have been developed and marketed in the recent past. Some operate with the continuous circulation of water through loops and coils and some are batch type, heating a reservoir of water. It is to the batch type of collector that the present invention is drawn.

U.S. Pat. No. 3,029,806 and 3,052,228 to Okuda show a bladder type of solar collector made of bonded pieces of flexible plastic wherein the top sheet is transparent to allow the transmittance of radiant energy and the bottom sheet is black to absorb radiant energy. U.S. Pat. No. 3,052,228 also provides a means for entering the bladder to clean slime and algae from the interior thereof.

While this type of collector will indeed provide heated water, it also has considerable drawbacks. Algae, slime or other impurities formed in the bladder are transported from the collector when the heated water is withdrawn. These impurities make it unattractive to utilize water thus heated for culinary or bathing purposes. Also, plastics and dark pigmented plastics in particular, are susceptible to deterioration caused by prolonged exposure to ultraviolet rays of light. This is particularly so when the solar bladder is empty and the ultraviolet rays are absorbed by the plastic skin of the bladder. The result of repeated exposure, particularly of black pigmented plastics, to ultraviolet rays is brittleness and cracking.

Even though the above drawbacks pertain to bladder type solar collectors, there are considerable advantages which are also applicable to this type of collector. A pump is not required to constantly circulate water. The collector can be left unattended over prolonged periods of time. A predetermined amount of water can be placed in the collector bladder and the bladder can be drained on an as needed basis, or when a predetermined water temperature has been reached. Maintenance problems are minimal in that complicated valves, monitoring and pumping equipment are not required.

Other patents utilizing flexibile plastic type of solar collectors are taught in U.S. Pat. Nos. 3,022,781; 3,513,828 and 4,520,793.

It may therefore be seen that if the problems associated with unwanted impurities and deterioration of the bladder skin were to be solved, that these types of collectors present many advantages, particularly in circumstances where batch types of water heating are useful.

OBJECTS AND SUMMARY OF THE INVENTION

It is, therefore, an object of the present invention to provide a bladder type solar collector in which heated water contained therein is inimical to the growth of algae, slime or other living organisms.

It is also an object of the present invention to provide a bladder type of solar collector in which repeated cleaning of the bladder interior is not required to prevent an accumulation of algae, slime or other organic growth therein.

Another object of this invention is to provide a bladder type of solar collector which will be resistant to the ultraviolet rays of the sun but which will be subject to penetration by radiant rays of visible light and longer electromagnetic waves.

Still another object of this invention is to provide a solar type collector wherein the bladder containing the water to be heated is encased in an insulated housing wherein radiant energy not directly absorbed by the water in the collector bladder will be absorbed by the housing and converted into heat for radiation and/or conductance into the water in the bladder.

These and other objects may be accomplished by means of a flexible bladder having a translucent top portion and a transparent or translucent bottom portion. The top portion may optionally contain a UV absorbing material that filters out UV light, preventing it from reaching water contained within the bladder since UV light wavelengths are known to promote the growth of algae and other organisms. The bladder skin is not darkened by pigmentation, such as carbon black. The bladder also contains inlet means for the entry of water and outlet means in the lower portion thereof for draining water therefrom. Also, means are preferably contained in the upper bladder surface to allow entrapped air to be expelled from the bladder interior, to prevent outside air from entering the bladder and also to prevent water from overflowing once the bladder is filled.

The bladder is encased in a housing having opposing sidewalls and endwalls, a darkened light absorbing bottom and light transmitting top. The interior of sidewalls and endwalls are also preferably darkened. Means are contained within the sidewalls and/or endwalls to permit the circulation of air according to the atmosphereic considerations.

Either or both, the light transmitting top and the upper translucent portion of the bladder, contains means to filter out ultraviolet light while allowing the passage of visible and longer wavelength solar rays.

The enclosure of the bladder within the housing permits heated air within the housing to further warm the water within the bladder and also to retain the heat in the bladder. By coating the floor and even the walls of the housing with a dark, preferably black, covering, the radiant energy entering the housing, and which is not directly absorbed by the water in the bladder, is absorbed by the covering. Although the housing has holes in the sidewalls or endwalls to permit the circulation of air, the size of the bladder is such that these holes are covered by the bladder when water is contained therein. Moreover, pivotal cover means are contained adjacent the holes of the outer wall surfaces to cover the holes, if desired. This creates a deadspace within the housing interior. Radiant energy entering this deadspace and being absorbed by the dark coating contained therein has minimal places to dissipate. Hence, most of such energy is retained in the deadspace as heat. By surrounding the bladder with heated surfaces, heat is conducted through the bladder into the water contained therein. Also, dead space air, being a poor heat conductor, serves to insulate the heated water from rapid cooling. If desired, the housing can be further insulated by providing double walls, floor and even a double transparent top to the housing. Also, in the place of double walls or floor with a dead airspace in between, one can increase the thickness of insulation in the walls and/or floor.

The bladder is constructed of a soft, flexible, heat resistant non-opaque plastic, such as polyvinyl chloride. The top portion of the bladder contains ultraviolet absorbers such as dyes and additives to inhibit the passage of ultraviolet light while remaining translucent to radiant light rays. The translucence causes a portion of the light ray to scatter when the bladder is empty. When the bladder is filled with water, it presents its maximum surface area to radiant energy and the index of refraction of light between the bladder and water directs most of the light into the water. Part of the radiant energy which does not penetrate the translucent plastic skin is deflected to the energy absorbing surface of the housing where it is absorbed as heat. When the bladder is empty and has a minimal surface area, the scattering of the radiant light on the translucent skin surface reduces heat buildup in the bladder. Moreover, when the bladder is empty, the holes in the housing are exposed and heat energy within the housing is allowed to dissipate into the outside air.

BRIEF DESCRIPTION OF THE DRAWINGS

FIG. 1. is a pictorial view of one embodiment of the invention showing a flexible bladder, having inlet and outlet means, encased in a housing.

FIG. 2 is a cross sectional view of the embodiment shown in FIG. 1 taken along lines 2—2 thereof showing the bladder in a filled condition.

FIG. 3 is a cross sectional view as shown in FIG. 2 with the bladder in an emptied condition.

FIG. 4 is a partial cross sectional view of a regulating valve means for preventing air inflow and water overflow from the bladder.

DETAILED DESCRIPTION OF THE INVENTION

There is shown in FIGS. 1-4 one complete and preferred embodiment of the invention. The entire solar collector 10, consists of two primarily separate but cooperating elements, the flexible bladder 11 and the housing 20.

As shown in FIGS. 1-3, the housing 20 is generally rectangular in shape and consists of opposing sidewalls 21 and 22, opposing endwalls 23 and 24, a floor 25 and a removable transparent lid 26. Lid 26 consists of a transparent top 27 encased in an outer frame 28 that fits about the outer perimeter of sidewalls 21 and 22 and endwalls 23 and 24 and rests on the upper surface thereof.

The interior portions of floor 25, and preferably also sidewalls 21 and 22 and endwalls 23 and 24, are painted, or otherwise covered, with a dark coating, preferably black, so as to absorb radiant light rays and heat. The transparent top 27, or tops if a double layer is used, is made of any suitable glass or plastic which will transmit solar rays of light. Preferably, the top 27 will be selected from a material which will block the passage of solar rays in the ultraviolet range. Such materials are readily available under various tradenames. The blocking of solar rays in the ultraviolet range serves a dual purpose of preventing deterioration of the bladder skin and the growth of algae and other organisms in the heated water within the bladder. However, if the bladder contains UV absorbing agents, it may be preferable but not necessary for the transparent top to inhibit or prevent the passsage of solar rays in the UV range.

Although the housing 20 is described as being generally rectangular, the description is illustrative only, as other shapes such as square, triangular, circular, oval or any other polygonal shape will function equally well. Hence, the description of a rectangular housing is deemed to include all other shapes which are functional equivalents.

The floor and walls of the housing may be made of any suitable material such as wood, plastic or metal. Preferably, the material will be a poor heat conductor and radiator so as to retain heat within the housing interior. For that purpose, wood and plywood in particular is a preferred material.

As previously mentioned, it may be advantageous to further insulate the housing by making the walls, floor and even the lid with a double layer having an air space in between the layers. In the case of the floor and walls, the space could be filled with an insulating material such as plastic foam or fiber glass. A double layered top would serve the advantage of further filtering out ultraviolet light and protecting the housing from rain, hail or snow. Insulation can also be provided in the form of thickened walls or floor or of single walls or floor containing a layer of insulating material adjacent thereto.

In FIG. 1-3, there is shown a series of apertures 29 in opposing endwalls 23 and 24. These apertures may be contained just as easily in opposing sidewalls 21 and 22 or in all four walls. The purpose of apertures 29 is to allow the circulation or passage of air through the interior of housing 20 when desired. Usually, this will be when the bladder is empty and it is desired to maintain the temperature within the housing as cool as possible. However, there may be times, even when the bladder is empty such as in cool weather, when it is desired to maintain as much heat as possible within the housing to maintain the flexibility of the bladder. In that event, a cover 30, pivotally connected to the outer surface of endwalls 23 and 24 by hinges, or other suitable means, may be swung or pivoted over the apertures to maintain an enclosed environment within the housing interior.

The top 27 preferably contains an aperture 31 through which a valve stem 12 contained in the top portion 11a of bladder 11 may protrude. The functioning of a valve contained in valve stem 12 will be explained later. Also, the floor 25 will contain an aperture 32 through which a fill and drain line 13 may fit. Line 13 is connected to the lower portion 11b of bladder 11 to allow the entry and draining of water from the bladder interior.

Housing 20 also contains means for fixedly securing the housing to a base, such as a roof. Any suitable means such as hinges, clamps, brackets, screws, bolts, nails, adhesives and the like may be utilized and will be adapted as needed when a suitable base for placement of the housing has been determined. Obviously, the housing will be oriented to receive the maximum amount of solar rays. To that end, the housing may be mounted on a rotatable base if desired to maximize its useage. However, it is necessary to maintain the housing floor 25 at a level or near level position to accomodate the flexible bladder when filled with water.

The bladder 11 may be made up of a single piece of material or may be made of two separate pieces of materials joined by a seam as in U.S. Pat. No. 3,029,806. For purposes of illustration, FIGS. 1-3 show a unitary bladder 11 divided into two parts, i.e. upper part 11a and lower part 11b joined at dotted line 11c. The bladder is sized such that, when filled, if will essentially fill the interior space in housing 20 and cover apertures 29 in the housing walls.

The bladder is constructed of any flexible, durable, non-opaque material such as polyvinyl chloride. For example, suitable materials are those used in the construction of waterbed mattresses. The thickness and strength of the bladder skin will depend upon the size of the bladder and the amount of water it is to hold. In other words, bladder 11 must be sufficiently strong to withstand water pressure when the bladder is filled to capacity.

Because of the tendency of soft plastic materials to become brittle, crack and otherwise deteriorate in the presence of ultraviolet light, it is preferable to incorporate an ultraviolet light inhibitor in the plastic bladder skin. As previously mentioned, it is also preferable to prevent ultraviolet light from entering the water contained within the bladder inasmuch as ultraviolet light is known to promote the growth of algae, slime and other organisms in heated water. Ultraviolet absorbing or stabilizing agents are well known in the art. For example, para-amino benzoic acid (PABA) is a well known UV blocking agent utilized to prevent or inhibit sunburn. It is not uncommon to incorporate ultraviolet stabilizers into polymeric materials to prevent deterioration of the plastic. However, if the transparent top contains UV absorbing agents it may be preferable, but not necessary, to have these agents incorporated into the bladder skin.

Bladders described in the prior art, as referenced above, have generally consisted of a transparent top and a blackened opaque bottom. The transparent top allows passage of virtually all solar rays into the water and the black bottom makes sure that optimal absorption of those rays take place within the confines of the bladder skin. However, this optimal useage of solar rays is inimical to the life of the bladder and also promotes the growth of organisms within the heated water.

The bladder 11 of the present invention is constructed such that, when empty, minimal heating by solar rays will occur. Hence, the top portion 11a is formed from a flexible plastic which is translucent to solar rays. By translucent is meant that the solar rays will be somewhat scattered or diffused when reaching the surface of the bladder and penetrating its skin. Incident rays of light will be refracted, in any event, upon penetrating the plastic skin. Depending upon the index of refraction of the plastic relative to water, there will be further refraction of the rays when entering the water contained in the bladder. While the scattering or diffusion of light impinging upon the bladder skin does not take full advantage of the solar rays, the scattered light not absorbed is not all lost. That which is directed to the dark floor or sides of the housing is absorbed and converted into heat energy. In turn, this heat energy may be utilized to heat the bladder skin and the water contained therein. Some energy will escape by being reflected back through the top 27 thereby reducing somewhat the efficiency of the collector. However, the gains to be realized from the present invention are deemed to far exceed the loss of efficiency.

When the bladder is empty, the solar rays impinging upon the translucent bladder skin are primarily transmitted or scattered and not absorbed. Those passing through the top portion 11a of the bladder continue onto lower portion 11b. If the lower portion is translucent, further scattering will take place. However, if the lower portion is transparent, the solar rays will be absorbed by the dark surface of floor 25 or its surrounding sidewalls. When the bladder is empty, holes 29 in the walls will normally be open and the heat absorbed by the housing can dissipate rather than being transferred to the bladder. The prior art has not shown such a cooling arrangement to be possible.

The bladder is illustrated in FIGS. 1-3 as containing a single port at the bottom connected to line 13 for filling and draining of the bladder. Line 13 is intersected by a two way valve 14 to allow water from fill line 15 to enter line 13 and into the bladder, or to allow heated water from the bladder to drain via line 13 through valve 14 and into drain line 16.

The upper portion of bladder 11a, as shown in FIG. 4, preferably contains a valve stem 12 which contains a valve preventing outside air from entering the bladder. Valve stem 12 is secured in an upright position to bladder portion 11a. Inside valve stem 12 is an upper thickened seating portion 17a and a lower thickened seating portion 17b. Located between the thickened seating portions 17a and 17b is a sliding ball valve 18. The facing surfaces of thickened portions 17a and 17b, which will come in contact with ball valve 18, are shaped to receive the ball valve surface in a sealing relationship. The density of the ball valve 18 is greater than air but less than water. Hence, the ball valve may be made of rubber, plastic or any other material which has sufficient flexibility to sealingly engage seating surfaces of portions 17a and 17b. The thickened portions forming 17a and 17b may be made of any suitable hard non-corrosive materials such as plastic, rubber or stainless steel.

When the bladder 11 is filled, any air trapped within the bladder will escape through valve stem 12 since the ball valve is heavier than air. Conversely, air cannot enter the bladder 11 from the outside through valve stem 12 since the downward passage of air would force ball valve 18 against sealing surface of 17a. Overflow of water from the bladder through valve stem 12 is also prevented since the ball valve is lighter than water. Hence, water rising through valve stem 12 would force ball valve 18 against the sealing surface of 17b. However, should the water in bladder 11 become sufficiently hot that it begins to boil, steam would escape through valve 12 and prevent pressure buildup within the bladder.

The only precaution that must be taken when filling bladder 11, is that the water pressure of the inlet line must not be greater than the bladder can stand in the event that the bladder becomes filled before the inlet water is turned off.

From the above description, it may be seen that bladder 11 and housing 20 each contribute, in a cooperating manner, to the utilization of solar rays in heating water contained within the bladder and maintaining that heat. The bladder serves to contain the water and receive solar rays of wavelengths primarily longer than the ultraviolet range. However, because the bladder skin is translucent and not darkened with pigmentation, it would not be heated as efficiently if it were not located within housing 20. At the same time, the life and fexibility of the bladder skin is preserved by these same properties. Also, the water within the bladder is not as susecptible to growth of organisms. The housing functions as a heat sink, receives and absorbs solar rays not absorbed by the bladder, protects the bladder from outside elements such as wind, rain, and snow and interacts to retain heat around the bladder. The housing further functions to prevent the bladder from too much heat when the bladder is not filled by allowing the circulation of air through the housing. The housing thus protects the bladder from the damaging effects of the outside environment and from extreme shifts in temperature while simultaneously serving to retain heat in the water within the bladder.

The housing 20 is positioned on a roof or other strategic location where it will receive maximum exposure to solar rays. The bladder 11 is inserted to the housing interior when lid 26 is removed. The fill and drain line 13 is passed through aperture 32 in floor 25 and the plumbing, consisting of two way valve 14, fill line 15 and drain line 16, is connected. Any other suitable plumbing may be utilized and still be within the scope of the invention. For example, the fill line may be separate and enter the bladder from the top or any other suitable location.

With the housing 20 located in a relatively level position, the bladder 11 is distributed evenly within the interior thereof and the lid 26 is set in place with valve stem 12 protruding through aperture 31 in top 27.

The bladder is filled to the desired capacity by the passage of water through fill line 15, valve 14 and line 13 into the bladder 11. Pressure gauges, valves and other equipment which will automatically shut off the water when a certain pressure is reached, may be attached to prevent excessive pressure within the bladder caused by overfill with water. Also, if desired, temperature sensing means may be inserted in the housing and/or bladder to indicate the water temperature and allow the drain to be actuated when the water in the bladder reaches a set temperature.

The bladder is drained when desired, such as at the end of a heating cycle, i.e. day, or when a certain temperature is reached. The water may be drained into storage means such as a gas or electric water heater. In the alternative, the water may be passed directly to a laundry room, bathroom, kitchen or the like for immediate use.

Thus, on a typical day of operation, the bladder 11, located in the housing, is filled with the desired amount of water from a suitable source. Ball valve 18 in valve stem 12 allows air in the bladder to escape as the filling takes place, and also prevents air from entering the bladder when water is being drained. Radiation from the sun passes through top 27, where UV rays are preferably filtered out. The solar rays impinge upon the translucent bladder skin, where some are absorbed and converted into heat. Other rays, not absorbed, are reflected onto the darkened heat and light absorbing interior of the housing and converted to heat. Some of this heat is also eventually absorbed by the water and that which is not serves to maintain an elevated temperature within the housing interior. Bladder 11, being filled, blocks ventilating holes 29, preventing circulation of air through the housing interior. When the water in the bladder is heated sufficiently, drain lines and valves 13, 14 and 16 are opened. As the water is removed, ball valve 18, in valve stem 12a, prevents air from entering the bladder and it uniformly collapses. As the bladder empties, ventilating holes 29 are uncovered and air is allowed to circulate through the housing interior. Ventilation is forced since the heated air in the housing interior, being hotter than the outside envrionment, will be less dense, thereby creating air currents as the denser outside air enters the ventilation holes. If the outside temperature is sufficiently low that ventilation is not desireable, covers 30 may be swung or pivoted to cover apertures 29 and retain heat within the housing interior.

While the above description teaches one complete embodiment of the invention, the scope of the invention is drawn to all functional equivalents of what is disclosed. Therefore, the claims are limited only by the appended claims.

I claim:

1. A solar collector for heating water comprising:
   (a) a housing having a floor, connected to contiguous upwardly extending opposing sidewalls and endwalls and a removable transparent lid adapted to fit about said sidewalls and endwalls, said lid containing an aperture through which a valve stem can be inserted, said floor being covered with a dark radiation absorbing material, said floor further containing an aperture through which a water line can be inserted,
   (b) a non-opaque soft flexible plastic bladder contained in said housing said bladder having an inlet line for filling the bladder with water and an outlet line in the lower portion thereof for removing water therefrom, said outlet line in said bladder extending through said aperture in the floor of said housing, said bladder also containing an upwardly extending valve stem in the upper portion thereof extending through said aperture in said transparent lid, said valve stem containing a valve which allows air in said bladder to escape, prevents air from entering the bladder and prevents water from overflowing the bladder when filled with water; and
   (c) wherein at least one of said transparent lid or the upper portion of said bladder contains ultraviolet light absorbing properties to inhibit the transmission of ultraviolet solar rays therethrough.

2. A solar collector as in claim 1 wherein said transparent lid contains ultraviolet light absorbing properties to inhibit the transmission of ultraviolet solar rays therethrough.

3. A solar collector as in claim 1 wherein the upper portion of said bladder contains ultraviolet light absorbing properties to inhibit the transmission of ultraviolet solar rays therethrough.

4. A solar collector as in claim 1 wherein the valve in said valve stem is a ball valve having a density lighter than water and greater than air.

5. A solar collector as in claim 1 wherein at least one set of said opposing sidewalls or endwalls contains ventilation apertures and wherein said bladder is sized such that, when filled with water, said bladder will cover said ventilating holes in said housing but when empty will fall below said ventilating holes.

6. A solar collector as in claim 5 wherein pivotable cover means are attached to the outside walls of said housing adjacent said ventilation apertures to open or close said ventilation apertures to circulation of air inside said housing.

7. A solar collector as in claim 5 wherein at least the upper portion of said bladder is translucent so as to scatter solar radiation.

8. A solar collector as in claim 7 wherein the interior of said sidewall and endwalls of said housing are also covered with a dark radiation absorbing material.

9. A solar collector as in claim 1 wherein said inlet line and outlet line are the same and wherein valve means are located on said line to allow water to either enter or drain from said bladder according to the positioning of the valve.

10. A solar collector according to claim 1 wherein said housing is insulated.

11. A solar collector according to claim 10 wherein said lid consists of a double layer of light transmitting material.

12. A solar collector according to claim 11 wherein said insulation also consists of a double floor, double endwalls and double sidewalls in said housing.

* * * * *